United States Patent [19]

Hoang et al.

[11] Patent Number: 5,422,009
[45] Date of Patent: Jun. 6, 1995

[54] REMOVAL OF CALCIUM FROM AMINE SOLUTIONS

[75] Inventors: Yen K. Hoang, Mission Viejo; James Mladenik, Irvine; Gary Youngman, Fullerton, all of Calif.

[73] Assignee: Atlantic Richfield Company, Los Angeles, Calif.

[21] Appl. No.: 172,012

[22] Filed: Dec. 22, 1993

[51] Int. Cl.$^6$ ............................................. B01D 15/04
[52] U.S. Cl. .................................. 210/669; 210/687; 210/694
[58] Field of Search .............. 210/663, 669, 687, 694; 423/228

[56] References Cited

U.S. PATENT DOCUMENTS

| | | | |
|---|---|---|---|
| 2,797,188 | 6/1957 | Taylor, Jr. et al. | 196/32 |
| 4,113,849 | 9/1978 | Atwood | 423/574 R |
| 4,753,736 | 6/1988 | Reichgott | 210/674 |
| 4,795,565 | 1/1989 | Yan | 210/669 |
| 4,853,130 | 8/1989 | D'Angelo et al. | 210/663 |
| 4,966,710 | 10/1990 | Kim et al. | 210/687 |

Primary Examiner—Ivars Cintins
Attorney, Agent, or Firm—Tom F. Pruitt

[57] ABSTRACT

A process for removing calcium from an amine-water solution is provided by using a low calcium cationic exchange resin which preferably has large pores to avoid hydrocarbon coating of the resin. Preferably, the resin is pretreated to reduce calcium concentration of the resin to less than two parts per million prior to use for calcium removal.

5 Claims, 2 Drawing Sheets

REMOVAL OF CALCIUM FROM AMINE SOLUTIONS

BACKGROUND OF THE INVENTION

1. Field of the Invention

This invention relates to a process for removing calcium from amine-containing solutions. In one aspect, this invention relates to a process for removing calcium from amine-water solutions used in gas purification processing units for removal of $H_2S$ and $CO_2$ from gaseous process streams.

2. Description of the Prior Art

It is well known in the gas purification art that sulfur containing compounds can be removed from sulfur-contaminated process gas by contacting such gas with amine absorbent solutions. As used in this specification and the appended claims, the term "amine" means an amine selected from a group consisting of monoethylamine, diethylamine, triethylamine and methyl diethylamine and may include other amines which are used for removal of sulfur-containing compounds from gaseous streams, as are known in the art.

The amine absorbent solutions are effective to absorb $H_2S$, as well in some instances other sulfur compounds such as COS and $CS_2$. The "rich" or sulfur-loaded absorbent is then conventionally stripped by heating to release an acid gas containing $H_2S$ and other acidic sulfur compounds. The acid gas can be disposed of by incineration; however, incineration alone produces combustion gases having a relatively high $SO_2$ content, and this is environmentally unacceptable. It is desirable to subject sulfur-containing acid gases to a Claus reaction to recover a substantial portion of the sulfur contained therein. It is also known to be desirable to treat the tail gas stream from the Claus unit in a manner to bring the sulfur emissions from the tail gas unit to an environmentally acceptable range.

Amine-water solutions used for gas treatment operations typically comprise from about fifteen to about fifty percent or more by amine, more typically in the range of about twenty to thirty percent (20-30%) amine, in water. Water used to make an amine-water solution is typically contaminant free demineralized or distilled water. In refinery related operations, water added as make-up water to adjust the solution water concentration for system losses is typically steam condensate, which is substantially demineralized and fairly contaminant-free; however, during $H_2S$ removal duty and recirculation, such streams will gather hydrocarbon material and contaminants.

Amine-water solutions used as absorbent will entrain or otherwise contain hydrocarbons and heat stable salts which are not removed by stripping during regeneration but generally contain little or no calcium. The presence of even trace amounts of calcium in an amine-water solution causes problems in sulfur removal operations. The calcium readily reacts with the $CO_2$ present to form calcium carbonate. The calcium carbonate precipitates out at system operating conditions and plugs packing and trays of the contactors, as well as recirculation lines. The plugged vessel components and line requires maintenance downtime and associated cleanout labor to remove the calcium carbonate. Thus, persons operating a gas-scrubbing system employing amine-water solutions will seek to maintain calcium concentration at a very, very low level. In some instances, however, calcium contaminated water enters the system. For instance, if there is a cooler failure and impure cooling water leaks into the amine-water system, the added cooling water can raise calcium to an unacceptable level and precipitated calcium carbonate can become an operational and maintenance problem.

SUMMARY OF THE INVENTION

It is thus an object of this invention to control the rate of formation of calcium carbonate in gas purification units which employ amine-water solutions. It is another object of this invention to remove calcium found at low concentrations from an amine-water solution.

We have discovered a process for removing relatively low levels of calcium from an amine-water solution. We have found that certain cationic exchange resins can remove calcium from an amine-water solution, if properly utilized. We have found that both strong and weak cation exchange resins are useful for removing calcium from amine-water solutions. We have also found that, in a process for removing calcium from an amine-water solution, the resin is preferably selected or treated in a manner to ensure that the resin will not contribute calcium to the amine-water stream. We have discovered that a large pore resin, including those of the class of resins referred to as macroreticular resins, is preferably employed to avoid plugging or coating of the resin by hydrocarbons found in the amine-water stream.

In one embodiment of this invention, a process for removing calcium from a solution comprising water and amine, such as an amine selected from the group consisting of monoethylamine, diethylamine, triethylamine and methyl diethylamine, or mixtures thereof, and further comprising particulate matter, hydrocarbons and calcium, comprises (a) filtering the solution to remove at least a portion of the particulate matter to form a first filtered solution; (b) filtering the first filtered solution by contact with particulate carbon to remove at least a portion, and preferably as much as possible, of the hydrocarbons to form a second filtered solution comprising particulate carbon; (c) filtering the second filtered solution to remove at least a portion of the particulate carbon to form a third filtered solution; (d) contacting the third filtered solution with a sulfonated cationic exchange resin, which preferably comprises a sulfonated divinylbenzene styrene copolymer, to remove at least a portion of said calcium. We have found that substantially any escaped or non-removed hydrocarbons may foul the resin bed, and it is most preferable to remove as much of the hydrocarbons as possible from the stream to be treated prior to introducing same to the resin bed. In one variation of this embodiment, the sulfonic cationic exchange resin is pretreated by washing with demineralized wash water to reduce the calcium concentration of the wash water from the resin wash to less than approximately two parts per million by weight prior to first contacting with the third filtered solution. We have discovered that although the process of this invention is effective for removal of higher concentrations of calcium in amine-water solutions, it is effective to remove low levels of calcium. Thus, in one preferred variation of this embodiment, the solution comprising amine and water may comprise as little as about forty parts by million by weight calcium, and in another variation the concentration of calcium in the amine-water solution may be as low as in the range of about ten to about twenty parts per million by weight calcium. The term "particulate matter", as used in the specifications and claims, refers to non-liquid and non-gaseous particles such as carbonaceous fines, particles of heat stable salts, and other particles entrained in or conveyed by an amine-water solution.

These and other objects and advantages, details, features, and embodiments of this invention will become apparent to those skilled in the art from the following detailed description of the invention, the drawings and the appended claims.

BRIEF DESCRIPTION OF THE DRAWINGS

In the accompanying drawings.

DESCRIPTION OF PREFERRED EMBODIMENTS

This invention is illustrated with reference to the drawings, for purposes of illustration of preferred embodiments, it being understood that this invention is not limited thereto.

Figure 1:
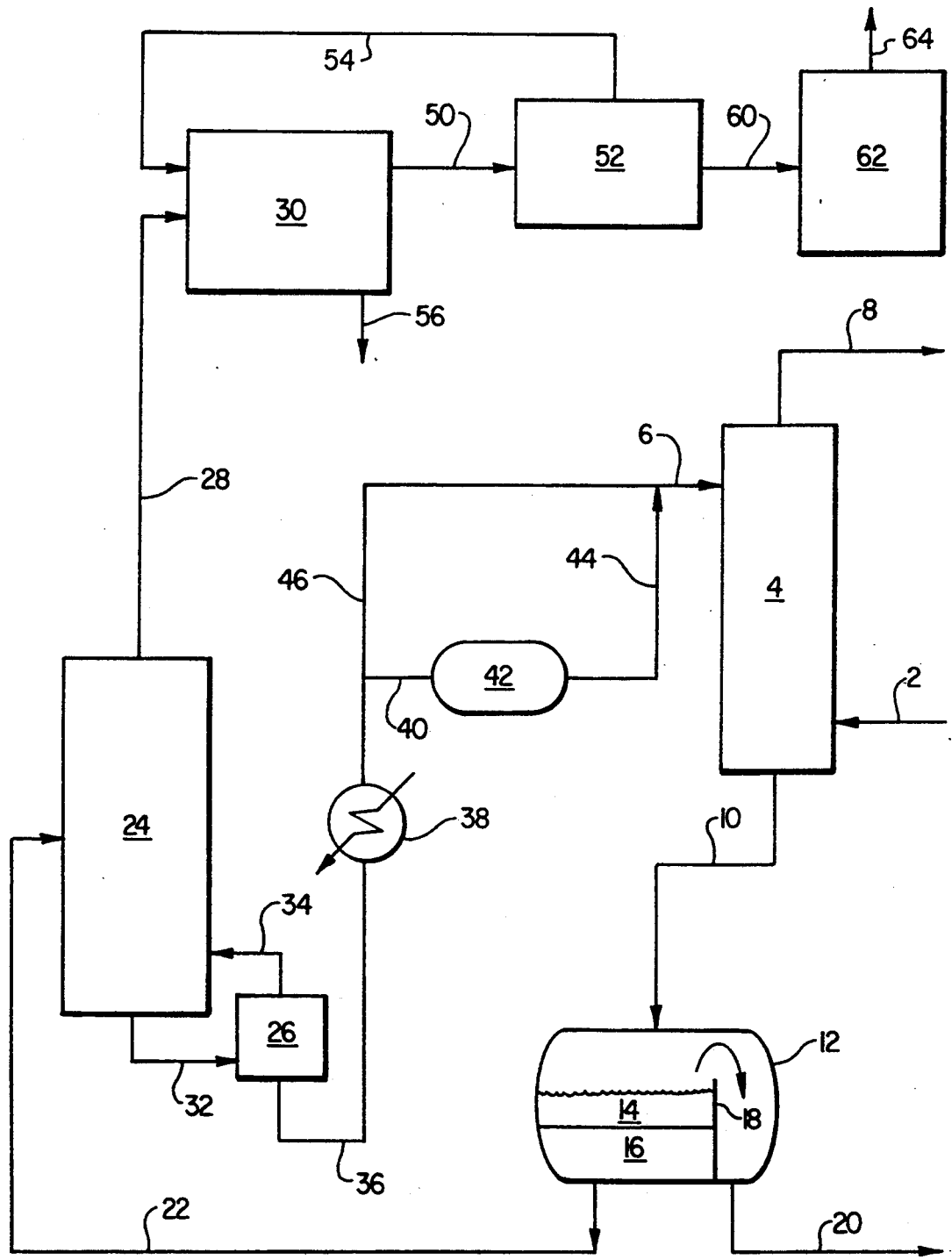
FIG. 1 is a schematic representation of a prior art gas purification process unit, and, FIG. 2 is a schematic representation of the amine treatment process of this invention.

FIG. 1 is a schematic representation of a prior art gas purification process unit. Feed gas 2 containing hydrogen sulfide and other sulfur-containing compounds, as well as carbon dioxide and other gases and entrained or gaseous hydrocarbons, is fed to a contactor 4. In contactor 4, the feed gas 2 is contacted in a countercurrent fashion with a lean amine-water solution 6 to absorb a portion of the $H_2S$ and $CO_2$ and absorb or entrain hydrocarbons to form a treated gas 8 with reduced $H_2S$ and $CO_2$ concentration which passed from the contactor 4. Loaded, or rich, amine-water solution 10 containing absorbed $H_2S$ and $CO_2$ and hydrocarbons passes from contactor 4 to a hydrocarbon flash or separation surge drum 12. In the surge drum 12, a level of hydrocarbon 14 forms above the amine-water solution level 16 and passes over a baffle 18, and the hydrocarbon is withdrawn from the flash/surge drum 12 via conduit 20 to tankage. Rich amine-water solution with minimum hydrocarbon 22 passes from the hydrocarbon flash/surge drum 12 to a heat regenerator 24 having a reboiler 26. Acid gas 28 which comprises $CO_2$, $H_2S$ and other freed gases that are stripped or disabsorbed from the amine-water solution 22 during regeneration pass from the regenerator 24 to a Claus unit 30. Also, an amine-water stream 32 is passed from the lower zone of regenerator 24 to a reboiler 26 where such stream 32 is heated and recirculated via conduit 34 back to the regenerator 24. An amine-water stream 36 is passed to a cooler 38 where the stream 36 is cooled to a temperature suitable for use in the contactor 4. During regeneration, some water losses may occur and make-up water 48 is typically added downstream of the reboiler 26. Downstream of the cooler 38, the flow is split into a first stream 40, which passes through the filter system 42 to form a filtered lean amine-water stream 44. Stream 44 can be directed via conduit 6 as lean amine to the contactor 4. During maintenance of the filter 42, the filter 42 is bypassed via conduit 46. Claus reactor 30 converts $H_2S$, and certain other sulfur-containing gases, in stream 28, to sulfur 56 by air oxidation by the well-known Claus reaction in one or two reactive steps, depending upon the concentration of $H_2S$ in stream 28. Because the Claus reaction is reversible wherein the accumulation of sulfur vapor and water vapor prevents complete conversion, the effluent 50 from the Claus unit 30 is passed to a tail gas unit 52. A $H_2S$ recycle is recycled back to the Claus unit 30 for a more complete conversion. A sulfur stream 56 is removed from the Claus unit 30. Unconverted sulfur species 60 are passed to an incinerator 62. Many variations of such prior art processes as shown in FIG. 1 are known in the art.

Figure 2:
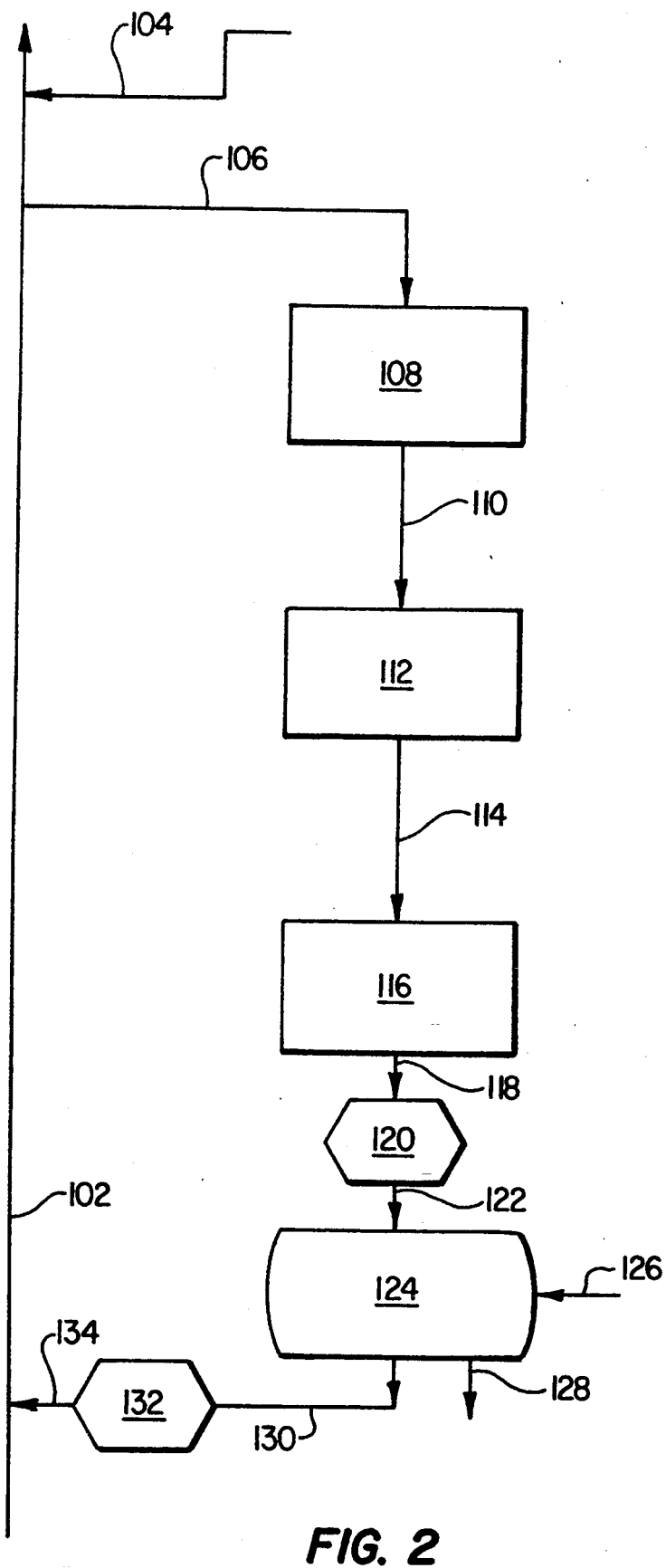

FIG. 2 is a schematic representation of one embodiment of an amine-water solution treatment process of this invention. For purposes of illustration in FIG. 2, the same identifying numerals, as assigned and used in FIG. 1, are used in the discussion of FIG. 2. The amine-water stream 102 to be treated contains calcium and is preferably taken as a sidestream draw downstream of a regenerator, such as a draw 40, as shown in FIG. 1, downstream of a regenerator 24, also shown in FIG. 1. The amine-water stream 102 may contain make-up water 104, which may provide a source of problem calcium contamination. The amine-water stream 102 is preferably lean amine from a regenerator and is more preferably downstream of any coolers which use cooling water and may provide a source of calcium-contaminated water. A lean amine-water slipstream 106 is drawn from stream 102. Preferably, the lean stream 106 is removed at a rate where the rate of flow of stream 106 is in the range of about two volume percent to about eight volume percent of the total flow of stream 102, although those skilled in the art appreciate that rate of slipstream 106 withdrawal may be higher or lower depending on the line and vessel sizing. The slipstream 106 passes to a particular filter 108. This filter 108 may remove particulates, including ionic contaminants and salts, including some heat-stable salts. Preferably, this filter is the size and range of about five to ten microns and produces a first filtered stream 110, which is preferably passed to a carbon filter 112. The carbon filter 112 may remove at least a portion of the hydrocarbons from the first filtered amine-water stream 110 and also removes some heat-stable salts to form a second filtered stream 114 which is passed to a second particulate filter 116. The carbon filter 112 preferably contains carbon particles sized in the range of about six to about eight by about thirty to about forty mesh; more preferably, about ninety-five percent greater than thirty mesh and five percent less than about eight mesh. The second particulate filter 116 may remove trace amounts of carbon which may be found in stream 114, such being contributed from the carbon filter 112. The second particulate filter 116 also may remove a portion of the particulates which were not removed by filters 108 and 112 to form filtered stream 118. Stream 118 is preferably passed through an optional monitor 120 as stream 122 where calcium concentration of stream 118 is measured.

Effluent 122 from the monitor 120 is passed to a calcium removal resin bed 124. Preferably, the resin for calcium removal is cationic exchange resin, preferably of a sulfonic acid type, and more preferably, a sulfonated divinylbenzene styrene copolymer-based resin. An example of a preferred resin is Amberlight IR-122 which is commercially available from Rohm & Haas Company. Prior to using the resin bed 124 in calcium removal service, it is preferable to pretreat same by washing with a suitable wash fluid 126, which passes in contact with the resin bed 124 and from the resin bed 124 via effluent conduit 128. Suitable wash fluids include demineralized water, such as steam condensate, or distilled water, preferably containing substantially no calcium. Also, preferably, the resin bed 124 is washed until the concentration of calcium on resin 124 is less than two parts per million calcium by weight. Amine-water stream 122 is passed over the calcium resin bed 124 to form a calcium-reduced amine-water stream 130. Stream 130 is preferably passed through an optional monitor 132 where concentration of calcium in stream 130 is measured. The effluent 134 from the monitor 132 is returned to and added to the lean-amine circulation loop 102.

We have found that it is preferable to employ a quantity of resin 124 to reduce the calcium in stream 122 to less than seven parts per million by weight, and most preferably less than four parts per million by weight, and most preferably to two parts per million by weight or less.

We have also found that it is preferred not to regenerate the cationic resin 124 in place by use of a regeneration solution or regenerative wash. Resin 124 regenerated in situ may contain excessive amounts of calcium to render it ineffective for removal of additional calcium from stream 124. We have found that once the resin 124 is used for removal of calcium in accordance with a process of this invention, from an operational perspective, it is preferable to remove the exchange resin 124 and replace same with fresh resin which is pretreated as described in the specifications and claims. We have found that this removal is preferable since we have found that the resin generally does not become saturated with calcium because the resin becomes coated with hydrocarbon first. Although it is possible to wash the hydrocarbon off of the resin with a solvent or detergent, such is not preferable as solvent or soap residue from the resin can enter the amine-water system and cause foaming or other adverse impacts on the process.

While the invention has been described in conjunction with presently preferred embodiments, it is not limited thereto. For example, within the scope of this invention is the addition of one or more secondary carbon beds upstream of the resin bed to "polish" the stream to be treated by the resin bed by further absorbing or removing residual hydrocarbons to a specified or desired level before the stream to be treated is introduced to the resin bed.

We claim:

1. A process for removing calcium from a solution comprising amine and water, and further comprising particulate matter, hydrocarbons and calcium, said process comprising the steps of:
   a. filtering said solution to remove at least a portion of said particulate matter to form a first filtered solution;
   b. filtering said first filtered solution by contact with particulate carbon to remove at least a portion of said hydrocarbons to form a second filtered solution comprising particulate carbon;
   c. filtering said second filtered solution to remove at least a portion of said particulate carbon to form a third filtered solution; and,
   d. contacting said third filtered solution with a sulfonated cationic exchange resin to remove at least a portion of said calcium.

2. A process in accordance with claim 1 wherein said sulfonated cationic exchange resin is pretreated by washing with demineralized wash water to reduce the calcium concentration of said resin to less than approximately two parts per million calcium by weight prior to first contacting with said third filtered solution.

3. A process in accordance with claim 1 wherein said cationic exchange resin comprises a sulfonated divinylbenzene styrene copolymer.

4. A process in accordance with claim 1 wherein said amine is selected from the group consisting of monoethylamine, diethylamine, triethylamine and methyl diethylamine or mixtures thereof.

5. A process in accordance with claim 1 wherein said solution comprising amine and water comprises in the range of about ten to about twenty parts per million by weight calcium.

* * * * *